G. W. LOW.
PUMP PISTONS.
No. 195,764. Patented Oct. 2, 1877.
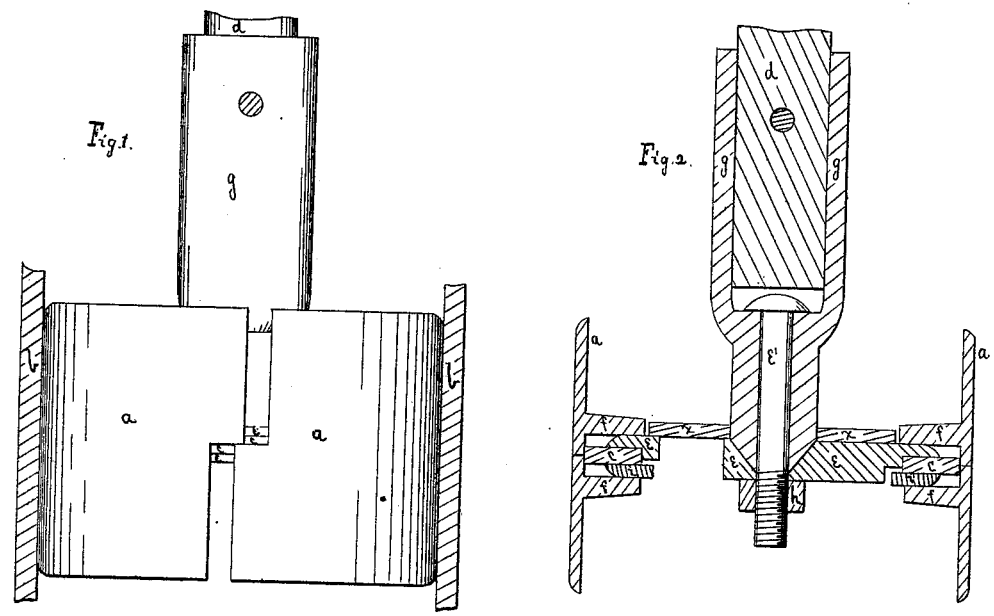
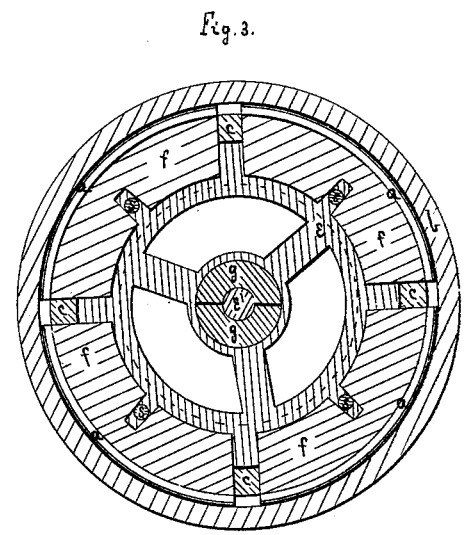

UNITED STATES PATENT OFFICE.

GARRETT W. LOW, OF ERIE, PENNSYLVANIA.

IMPROVEMENT IN PUMP-PISTONS.

Specification forming part of Letters Patent No. 195,764, dated October 2, 1877; application filed August 17, 1877.

*To all whom it may concern:*

Be it known that I, GARRETT W. LOW, of Erie, Pennsylvania, have invented a new and useful Improvement in Pump-Suckers, which improvement is fully described in the following specification, reference being had to the accompanying drawings.

The object of my invention is a pump-sucker made in segments which are self-adjustable, so as to compensate for wear.

Figure 1 is a vertical elevation of the sucker in a section of the pump-stock. Fig. 2 is a sectional view. Fig. 3 is an end view, with the valve $x$ removed, and its position shown by dotted lines.

In Fig. 1 the sucker is represented in a section of a pump-stock, $b\ b$. The sucker-rod $d$ is held by a pin in the socket $g$. The socket $g$ is in two sections, placed together and held in the funnel-shaped hole in the center of disks $e$ by the bolt $e'$ passing lengthwise of the socket through its lower end, and firmly fastened to the disk $e$ by nut $h$. The circumference of disk $e$ is recessed on its lower side, and in this recess is placed the rubber ring $c$, the circumference of which is in contact with the interior sides of the segments $a\ a\ a\ a$, between two flanges, $f\ f$, on the interior of each segment. The segments, when placed together around disk $e$, form a short cylinder, and their flanges $f\ f$ form a circular horizontal groove, in which is the rubber ring $c$, between the disk $e$ and the ring or washer $i$, both of which enter the groove formed by flanges $f\ f$.

A part of each segment $a$, at its circumference, projects over its adjacent segment, so as to form a horizontal joint between the two segments where the rubber ring $c$ is in contact with them. These joints prevent the water from passing between the interior side of the pump-stock and the circumference of the elastic ring $c$, and permit the adjustment of the segments $a\ a\ a\ a$ to the concavity of the pump-stock.

The pins $s\ s\ s\ s$, projecting from one side of disk $e$, enter slots in one of the flanges $f\ f$ on each segment $a$, to hold the segments in their relative positions, while the pressure of the elastic ring $c$ keeps them in contact with the concavity of the pump-stock. The ring $c$ may be made of a metallic spring instead of rubber.

There are openings $m\ m\ m$ through disk $e$, of a suitable size for the admission of water above the disk.

The valve $x$, which rests on disk $e$, and closes the opening when the sucker is being lifted, is a circular plate, centrally perforated, and sliding up and down on the lower part of socket $g$ of sucker-rod $d$.

I claim as my invention—

1. The segments $a\ a\ a\ a$, having the interior flanges $f\ f$, and so constructed and arranged that a part of each segment projects beyond a part of its adjacent segments to form water-tight joints, substantially as described.

2. The segments $a\ a\ a\ a$, in combination with the elastic ring $c$, disk $e$, valve $x$, and pump-stock $b$, substantially as described.

3. The elastic ring $c$, in combination with segments $a\ a\ a\ a$, disk $e$, valve $x$, pump-stock $b$, and ring $i$, substantially as described.

4. The pins $s\ s\ s\ s$, in combination with segments $a\ a\ a\ a$, disk $e$, elastic ring $c$, and pump-stock $b$, substantially as described.

5. The rod $d$ and the socket $g$, in combination with the bolt $e'$, disk $e$, and nut $h$, substantially as described.

GARRETT W. LOW.

Witnesses:
FRANK GUNNISON,
JOHN M. EVANS.